United States Patent [19]

Hastrup

[11] 4,301,128
[45] Nov. 17, 1981

[54] METHOD FOR PURIFICATION OF GASES

[75] Inventor: Niels E. Hastrup, Copenhagen, Denmark

[73] Assignee: F. L. Smidth & Co., Cresskill, N.J.

[21] Appl. No.: 129,586

[22] Filed: Mar. 12, 1980

[30] Foreign Application Priority Data

Mar. 16, 1979 [DK] Denmark ............................ 1100/79

[51] Int. Cl.³ ........................ B01D 47/00; B03C 3/00
[52] U.S. Cl. ........................................ 423/242; 55/10; 55/73; 55/122; 422/170; 422/186; 159/4 A
[58] Field of Search ............... 55/6, 10, 5, 73, 85, 55/89, 228, 124–126, 122; 423/242, 244; 422/170, 168, 169, 186; 159/4 A, 4 K, 16 R, 24 A

[56] References Cited

U.S. PATENT DOCUMENTS

| | | | |
|---|---|---|---|
| 3,784,389 | 1/1974 | Hastrup | 432/106 |
| 3,966,878 | 11/1976 | Pausch et al. | 423/242 A |
| 4,024,220 | 5/1977 | Ostroff et al. | 423/242 A |
| 4,039,304 | 8/1977 | Bechthold et al. | 423/242 A |
| 4,197,218 | 2/1978 | Gehri et al. | 423/242 |
| 4,198,380 | 4/1980 | Kohl | 423/242 A |

FOREIGN PATENT DOCUMENTS

| | | | |
|---|---|---|---|
| 1961048 | 6/1971 | Fed. Rep. of Germany | 55/85 |
| 2725436 | 12/1978 | Fed. Rep. of Germany | 423/242 |
| 435560 | 9/1935 | United Kingdom | |
| 1458417 | 12/1976 | United Kingdom | |

Primary Examiner—Bernard Nozick
Attorney, Agent, or Firm—Pennie & Edmonds

[57] ABSTRACT

The present invention is directed to a method for selective purification of gases. The method comprises feeding an exhaust gas containing a solid impurity and a gaseous impurity to a separator. A substantial portion of the solid impurity is separated. Then, the partially-purified gas is fed to a spray dryer. That gas is sprayed with an absorption agent to separate gaseous impurities. Then, the further, partially-purified gas is fed to another separator to separate remaining solid impurity. An exhaust gas which is substantially free of solid and gaseous impurities and fly ash having a desired quality are recovered.

2 Claims, 1 Drawing Figure

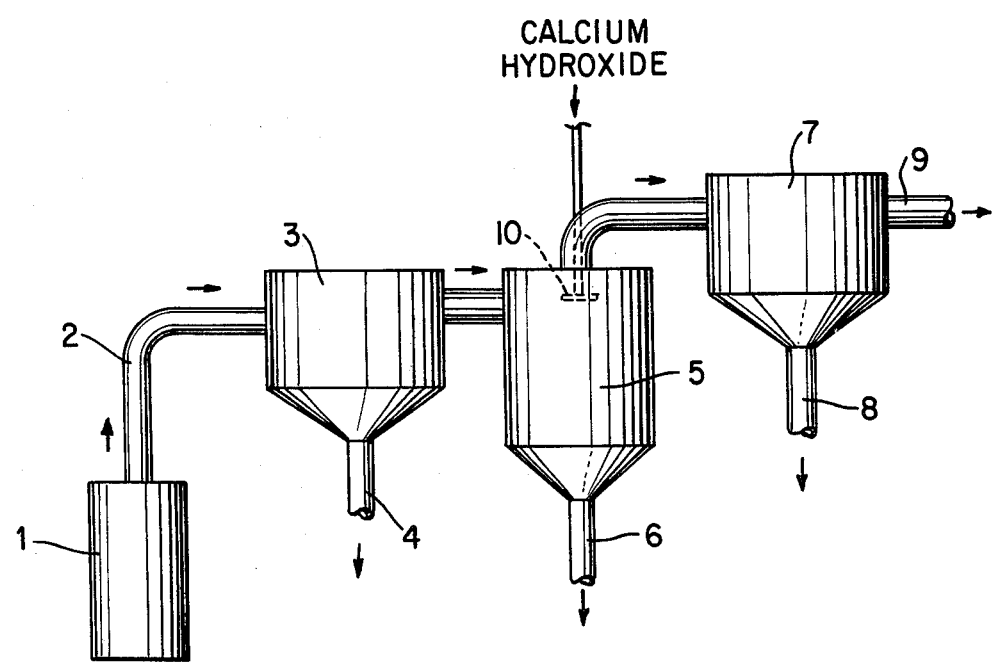

METHOD FOR PURIFICATION OF GASES

DESCRIPTION

1. Technical Field

This invention relates to a method for gas purification. More particularly, the invention relates to a method of for selective separation of fly ash and sulphur oxides from boiler plant exhaust gases. Fly ash is separated using a precipitator. Sulphur oxides are recovered using an absorption agent, added to a conventional spray dryer. Exit gas is dedusted using a filter.

2. Background Art

U.S. Pat. No. 3,784,389 discloses removal of gaseous impurities from a stream of exhaust gas. This is effected by causing the exhaust gas stream to pass through a spray drying plant. There, water is injected, which can include, for example, carrier particles. The gaseous impurities condense on the carrier particles and the heat released by the condensation evaporates the water. In this way, efficient wet washing has been achieved without a cumbersome slurry as a product. The United States patent is incorporated by reference.

When removing gaseous impurities, that are not directly condensable, the usual procedure has been to use the carrier particles consisting of a substance absorbing the gaseous impurity that is to be removed. The result is that the absorption is effected in the wet phase and the end product is dry. An important example of this procedure is the removal of sulphur dioxide from exhaust gases by the injection of a solution of calcium hydroxide. That compound is converted with sulphur dioxide to form a chemical compound which is dried and removed in solid form at the solids outlet of a spray dryer. Some of the solids are in the form of a fine powder which is entrained by the exhaust gas flow. This powder together with other solid particles contained in that gas flow, such as fly ash, are separated in a filter following the spray dryer.

Use of solid fuel produces large amounts of fly ash whose disposal involves some problems. Successful attempts have been made at mixing cement with ground fly ash. The fly ash is added when cement clinker is ground into finished cement. However, this use of the fly ash requires a certain quality of the ash. These requirements are not satisfied by the mixture of a spent absorption agent and fly ash that is deposited in the final filter or precipitator using the preceding method.

The present invention provides a method for selective purification of fly ash and spent absorption agent for gaseous impurities. This invention overcomes the disadvantages of the background art mentioned above, that is, fly ash having a quality suitable for use in cement is recovered.

DISCLOSURE OF INVENTION

The present invention is broadly directed to a method for selective purification of gases comprising: (a) feeding an exhaust gas containing solid impurity and gaseous impurity to a separator; (b) separating a substantial portion of the solid impurity; (c) then, feeding the partially-purified gas to a spray dryer; (d) spraying the gas with an absorption agent to separate the gaseous impurity; (e) then, feeding the further, partially-purified gas to another separator; and (f) separating additional solid impurity whereby an exhaust gas, substantially free of solid and gaseous impurities, and solid impurity, having a desired quality, are recovered.

More particularly, this invention is directed to a method for selective purification of exhaust gas from a boiler plant comprising: (a) feeding an exhaust gas containing excess oxygen, fly ash and sulphur oxides to an electrostatic precipitator; (b) precipitating about 90 percent by weight of the fly ash; (c) then, feeding the partially-purified gas to a spray dryer; (d) spraying the gas with an aqueous solution of calcium hydroxide to separate the sulphur oxides; (e) then feeding the further, partially-purified gas to a bag filter; and (f) filtering more of the remaining impurities whereby an exhaust gas, substantially free of fly ash and sulphur oxides, and fly ash, having a quality suitable for use in cement, are recovered.

The present invention is also broadly directed to a method for selective purification of exhaust gas, containing solid and gaseous impurities, from a boiler plant comprising: (a) solid-separation means for separating a substantial portion of the solid impurities from the exhaust gas; then, (b) means for feeding the partially-purified exhaust gas to a spray-drying means for separating gaseous impurities from the exhaust gas; then, (c) means for feeding the further, partially-purified exhaust gas to another solid-separation means whereby an exhaust gas, substantially free from solid and gaseous impurities, and solid impurity, having a desired quality, are produced.

More specifically, this invention is also directed to a method for selective purification of exhaust gas, containing excess oxygen, fly ash and sulphur oxides, from a boiler plant comprising: (a) an electrostatic precipitator for separating a substantial portion of the fly ash from the exhaust gas; (b) a spray dryer connected to the precipitator for separating sulphur oxides from the exhaust gas, which dryer includes feed means for spraying an aqueous solution of calcium hydroxide into the dryer; (c) a bag filter connected to the spray dryer for separating remaining solids from the exhaust gas whereby an exhaust gas, substantially free from fly ash and sulphur oxides, and fly ash, having a quality suitable for use in cement, are produced.

The present invention is further directed to a plant for the selective removal of fly ash and sulphur oxides from boiler plant exhaust gas comprising two separators and a spray dryer, connected between them, in which an absorption agent is added, whereby the fly ash and sulphur oxides are removed from the exhaust gas as it passes in series through one of the separators to the spray dryer and then through the other separator.

Selective purification of solid and gaseous impurities in an exhaust gas from a boiler plant is accomplished by means of a novel combination of a spray dryer and two separators. This combination is a critical feature of the invention, that is, the spray dryer is inserted between two separators, and all are arranged in series. With this arrangement, most of the solid impurity, such as fly ash, contained in the exhaust gas can be precipitated in the first separator. The gaseous impurity, such as sulphur oxides—sulphur dioxide ($SO_2$) and sulphur trioxide ($SO_3$)—passes through the separator to the following spray dryer. There, the gaseous impurity is absorbed in a convention manner. From the spray dryer, the exhaust gas passes through the second separator, in which entrained absorption agent powder is precipitated together with the remaining amount of fly ash which passed through the first separator.

According to the invention, the absorption agent is preferably a solution of calcium hydroxide. Such a solution is very suitable for removing acid gases, such as sulphur dioxide and sulphur trioxide, and may be used in a concentration permitting drying of the end product using the remaining heat from the exhaust gas. The concentration of the solution can be varied from slaked lime to milk of lime.

The separators used according to the invention are preferably conventional precipitators and more preferably conventional electrostatic precipitators. Such precipitators are often divided into several sections coupled in series, which permits inserting a conventional spray dryer between such sections. Where a surplus of oxygen occurs in the exhaust gas from a boiler, the corona of a first precipitator will contribute to the further oxidation of sulphur dioxide to sulphur trioxide. The latter oxide reacts more readily with the absorption agent.

The two precipitator sections need not be of the same type. Thus, according to the invention, the section before the spray dryer may be an electrostatic precipitator, by which oxidation of sulfur dioxide is obtained; while the section after the spray dryer may be a bag filter. In a bag filter, the dust, which consists essentially of entrained, converted and unconverted absorption agent, will deposit as a layer on the outer side of a filter bag. That layer can consist of active absorption agent, by which additional absorption of sulphur dioxide and sulphur trixoide is obtained as the exhaust gas passes the layer. This permits a smaller spray drying plant than would otherwise have been necessary to obtain a given cleaning efficiency.

BRIEF DESCRIPTION OF DRAWING

Features of the present invention will be described in connection with the accompanying drawing which depicts a flow diagram of the method of and a schematic representation for the plant according to the invention.

BEST MODE FOR CARRYING OUT THE INVENTION

A boiler and its attendant equipment 1, such as conventional preheaters and economizers, are depicted for utilizing the heat released by the combustion of a fuel so that an exhaust gas carried away through outlet pipe 2 has a temperature permitting it to be passed directly to a precipitator 3. There, about 90% by weight of the fly ash suspended in the exhaust gas is precipitated and withdrawn at the outlet 4 of the precipitator 3. From precipitator 3, the exhaust gas is fed to a spray dryer 5 past an atomizing device 10. An aqueous solution of calcium hydroxide is injected through and atomized by device 10. The calcium hydroxide reacts with the sulphur oxides (e.g., $SO_2$ and $SO_3$) of the exhaust gas. Water evaporates and a solid reaction product is discharged at the solids outlet 6 of the spray dryer. The reaction product contains a small amount of fly ash precipitated in the spray dryer. From the dryer, the exhaust gas is fed to another precipitator 7. There, the remaining fly ash and entrained powder of the reaction product are precipitated and withdrawn at outlet 8. Finally, the exhaust gas is passed through outlet 9 to a smoke stack.

The quality of the fly ash withdrawn at outlet 4 will not be affected by addition of absorption agent used to remove gaseous impurity, like sulphur dioxide. The reaction products removed at outlets 6 and 8 can be slightly contaminated by fly ash; but not to an extent that prevents its industrial application.

In this specification, the preferred application of the invention has been described, that is, for removing sulphur dioxide from boiler plant exhaust gas. But the invention is, with the choice of a suitable absorption agent, equally adaptable for removing other gaseous impurities. The preceding description of the preferred application of the invention is not intended to limit the invention.

I claim:

1. A method for selective purification of high temperature exhaust gas from a boiler plant comprising: (a) feeding an exhaust gas from a boiler plant containing excess oxygen, fly ash, and gaseous sulfur oxides to an electrostatic precipitator constructed and arranged to separate about 90 percent by weight of said fly ash; then, (b) first electrostatically percipitating about 90 percent by weight of said fly ash having a quality suitable for use in cement and oxidizing sulphur dioxide and sulphur trioxide by the corona discharge of the precipitator; (c) feeding the partially purified gas to another separator; then, (d) spraying the exhaust gas with an aqueous solution of calcium hydroxide absorption agent, to subsequently react with said gaseous sulphur oxides, in a concentration permitting a substantially dry product to be recovered using heat from the exhaust gas; then, (e) feeding the further partially-purified gas to a bag filter; and, (f) filtering the remaining fly ash with reacted absorption agent; whereby an exhaust gas, substantially free of fly ash and gaseous sulphur oxides; and fly ash, having a quality suitable for use in cement are recovered.

2. A method for selective purification of high temperature exhaust gas from a boiler plant comprising: (a) feeding an exhaust gas from a boiler plant containing excess oxygen, fly ash, and gaseous sulphur oxides to an electro static precipitator constructed and arranged to separate about 90 percent by weight of said fly ash; then, (b) first electrostatically precipitating about 90 percent by weight of said fly ash having a quality suitable for use in cement and oxidizing sulphur dioxide and sulphur trioxide by the corona discharge of the precipitator; (c) feeding the partially purified gas to another separator; then, (d) spraying the exhaust gas with an aqueous solution of calcium hydroxide absorption agent, to subsequently react with said gaseous sulphur oxides, in a concentration permitting a substantially dry product to be recovered using heat from the exhaust gas; then, (e) feeding the further partially-purified gas to an electrostatic precipitator; and, (f) filtering the remaining fly ash with reacted absorption agent; whereby an exhaust gas, substantially free of fly ash and gaseous sulphur oxides, and fly ash, having a quality suitable for use in cement, are recovered.

* * * * *

UNITED STATES PATENT AND TRADEMARK OFFICE
CERTIFICATE OF CORRECTION

PATENT NO. : 4,301,128
DATED : November 17, 1981
INVENTOR(S) : Niels E. Hastrup

It is certified that error appears in the above—identified patent and that said Letters Patent is hereby corrected as shown below:

The Abstract should include the following second paragraph:

--A plant for selective removal of fly ash and sulphur oxides from boiler plant exhaust gas is also described.--.

Column 1, line 8

"method of for selective"

should read:

--method of and apparatus for selective--.

Column 2, line 64

"convention" should read --conventional--.

UNITED STATES PATENT AND TRADEMARK OFFICE
CERTIFICATE OF CORRECTION

PATENT NO. : 4,301,128
DATED : November 17, 1981
INVENTOR(S) : Niels E. Hastrup

It is certified that error appears in the above—identified patent and that said Letters Patent is hereby corrected as shown below:

In claim 1, column 4, line 24

"percipitating" should read -- precipitating--.

Signed and Sealed this

Twenty-third Day of March 1982

[SEAL]

Attest:

Attesting Officer

GERALD J. MOSSINGHOFF

Commissioner of Patents and Trademarks